United States Patent [19]

Peck et al.

[11] 4,393,651

[45] Jul. 19, 1983

[54] FUEL CONTROL METHOD AND APPARATUS

[75] Inventors: Robert E. Peck, Prospect; Raymond D. Zagranski, Somers, both of Conn.

[73] Assignee: Chandler Evans Inc., West Hartford, Conn.

[21] Appl. No.: 183,059

[22] Filed: Sep. 2, 1980

[51] Int. Cl.³ .............................................. F02C 9/36
[52] U.S. Cl. ................................................ 60/39.281
[58] Field of Search .............. 60/39.28 R; 137/625.5, 137/117; 417/300, 305, 440

[56] References Cited

U.S. PATENT DOCUMENTS

| | | | |
|---|---|---|---|
| 3,053,047 | 9/1962 | Bodemuller | 60/39.28 R |
| 3,111,960 | 11/1963 | Marmo | 137/625.5 |
| 3,128,792 | 4/1964 | Rule | 137/625.5 |
| 3,272,187 | 9/1966 | Westbrook et al. | |
| 3,329,165 | 7/1967 | Lang | 137/625.5 |
| 3,683,870 | 8/1972 | Jackson | |
| 3,688,495 | 9/1972 | Fehler | 60/39.28 R |
| 3,724,485 | 4/1973 | Cox et al. | 137/117 |
| 3,730,159 | 5/1973 | Sallot | |
| 3,732,039 | 5/1973 | Carothers | 417/300 |
| 3,811,792 | 5/1974 | Kennedy | 417/300 |
| 4,015,426 | 4/1977 | Hobo et al. | 60/39.28 R |
| 4,138,204 | 2/1979 | Bruguera | 417/310 |

FOREIGN PATENT DOCUMENTS

| | | | |
|---|---|---|---|
| 723197 | 6/1942 | Fed. Rep. of Germany | 417/300 |
| 1310596 | 3/1973 | United Kingdom | |

*Primary Examiner*—Louis J. Casaregola
*Attorney, Agent, or Firm*—Radford W. Luther; Richard A. Dornon

[57] ABSTRACT

A fuel control for a gas turbine engine has a positive displacement pump (10) which directs fuel to a constant flow regulator (14) which generates a constant or fixed rate flow of fuel. A flow diverter (16) includes a dividing device which divides the constant flow of fuel between a discharge conduit (18) connected to the burner nozzles of the engine and a bypass conduit (20) connected to the inlet side of the pump. A computer (22) which is adapted to sense various engine parameters; and calculate fuel flow controls the flow dividing device in order to apportion the flow so that the calculated fuel flow is delivered to the engine.

9 Claims, 5 Drawing Figures

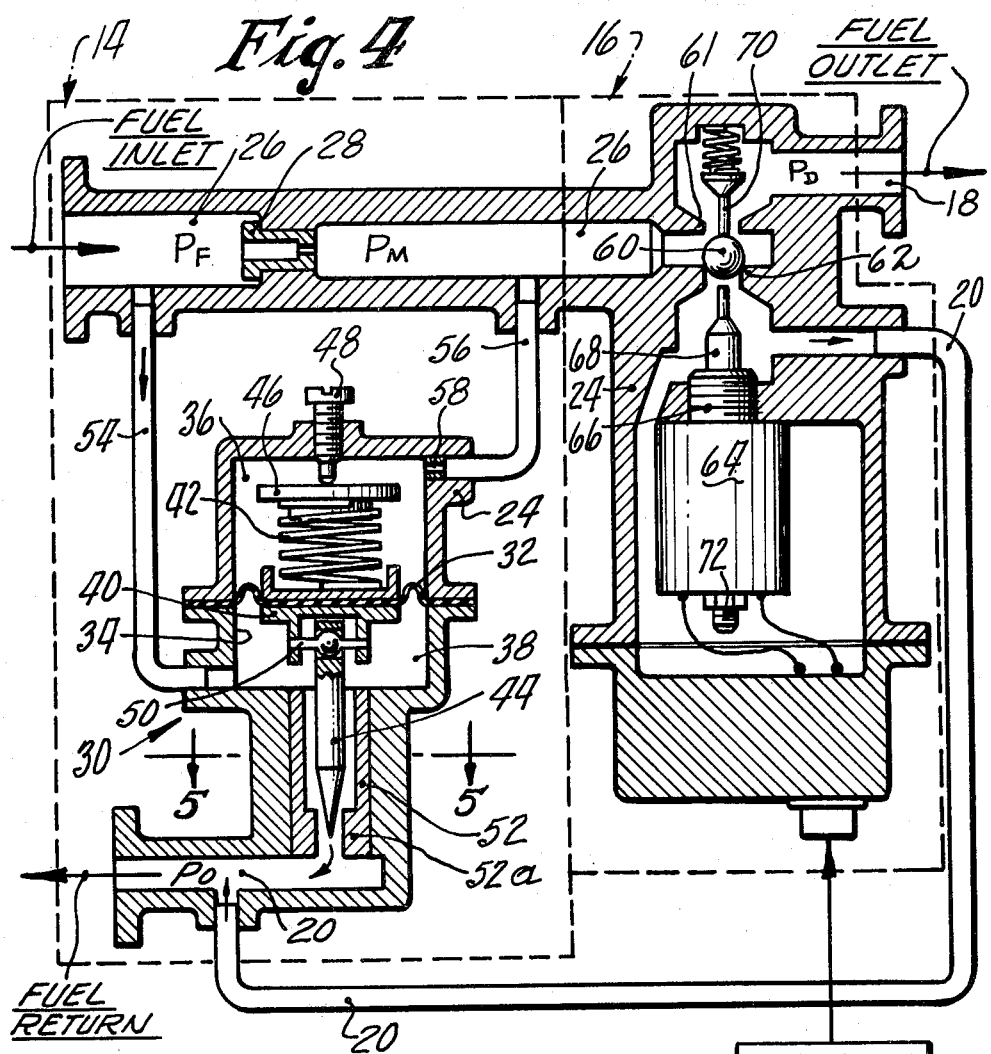
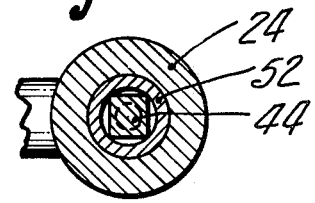
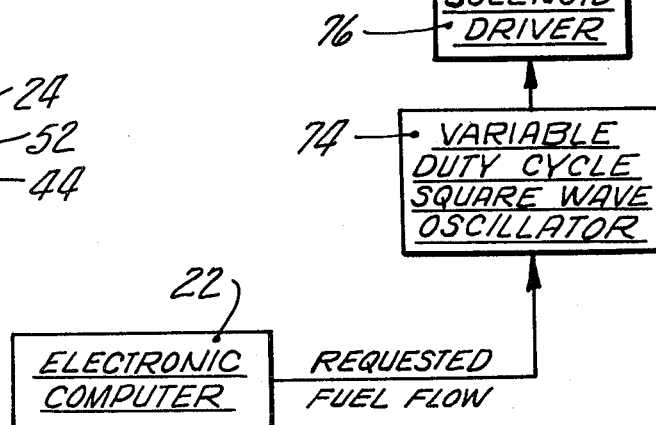

4,393,651

FUEL CONTROL METHOD AND APPARATUS

TECHNICAL FIELD

This invention relates to fuel controls for gas turbine engines.

BACKGROUND ART

The accurate metering of low fuel flows (of the order of a few pounds per hour) may be attained only with great difficulty. To meter low flows small metering areas are mandated, notwithstanding the provision of a metering head or pressure differential across the metering valve of minimal value. Metering valves adapted to provide small metering areas do not readily lend themselves to easy manufacture and are susceptible to clogging. Moreover, at low fuel flows, the discharge coefficient of the metering area tends to vary with fuel temperature to a greater extent than it would at higher flows.

Certain fuel metering systems in automobiles employ pulsed solenoids in order to interrupt the flow to the engine in such a manner as to produce a desired flow rate. However, flow stoppages of this nature engender pressure spike fluctuations which affect the proper functioning of upstream flow control elements.

DISCLOSURE OF THE INVENTION

The invention provides a fuel control for a gas turbine engine which is simple in construction and adapted to accurately meter low fuel flows without the need for small metering orifices. In addition, the invention provides an accurate and reliable method of delivering fuel to a gas turbine engine.

In accordance with the invention, a pump directs fuel flow to a constant or fixed rate flow regulator which generates a constant flow of fuel. A flow diverter divides the constant flow of fuel between a discharge conduit connected to the burner nozzles of the engine and an inlet conduit connected to the inlet side of the pump. The flow diverter is controlled by an electronic computer such that the scheduled fuel flow is furnished to the engine.

A pulsed solenoid controlled valve is particularly well-suited to function as a component of the flow diverter in a fuel control of the invention. By varying the duty cycle of the solenoid, the constant flow may be correctly apportioned between the discharge and bypass conduits. Because the flow from the regulator is never deadheaded (as it would be in conventional pulsed solenoid systems), pressure spikes or fluctuations are not impressed upon the upstream components. Hence, in a fuel control of the invention, the flow regulator is not required to bypass varying flows as a function of the duty cycle of the diverter valve. It will therefore be appreciated that regulator dynamic response in a fuel control of the invention will not be adversely affected.

Accordingly, it is a primary object of the invention to provide a fuel control for a gas turbine engine which incorporates a flow diverter adapted to apportion a constant flow of fuel between the engine and a bypass path.

Another object is to provide a method of controlling fuel flow to a gas turbine engine which includes dividing a constant flow of fuel between the engine and a bypass path.

These and other objects and advantages of the invention will become more readily apparent from the following detailed description when taken in conjunction with the accompanying drawings, in which:

BRIEF DESCRIPTION OF THE DRAWINGS

FIG. 4 is a schematic view of the hydromechanical section of a fuel control according to the invention shown in association with the electronic elements.

FIG. 5 is a sectional view of the bypass regulator, taken along the line 5—5 of FIG. 4.

BEST MODE OF CARRYING OUT THE INVENTION

Figure 1:
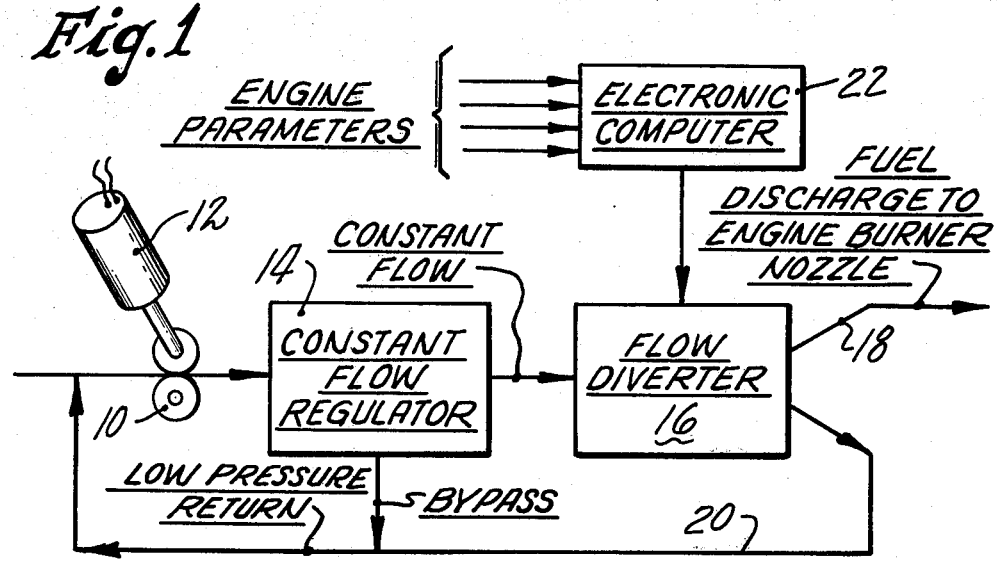
FIG. 1 is a functional block diagram of a fuel control of the invention.

Referring to the drawings and more particularly to FIG. 1, there is illustrated a block diagram of a fuel control of the invention. A gear pump 10 driven by an electric motor 12 supplies pressurized fuel to a constant or fixed rate flow regulator 14. The pump 10 will preferably be a positive displacement type pump because of engine starting flow requirements but could be an impeller type pump or even a pump having impeller and positive displacement elements. The constant flow regulator 14, which is preferably adapted to bypass fuel, generates a constant or fixed rate flow of fuel to a flow diverter 16. The flow diverter 16 functions to apportion fuel flow between a discharge conduit 18 connected to the burner nozzles of the engine and a bypass conduit 20 connected to the inlet side of the pump. While the flow diverter could embody a proportional or oscillating fluidic device, it is preferably partially constituted by a valve actuated by a pulsed solenoid. Flow diverter 16 is controlled by a computer 22 which senses various engine parameters and generates a signal indicative of a required engine fuel flow. The flow directed to the engine through the conduit 18 reflects the flow demanded by the computer 22.

The utilization of a pulsed solenoid operated valve offers a number of important benefits. Such valves are economical and of proven reliability. The electronic components needed to operate such valves are old and well-known devices having well-understood characteristics and capabilities. For example, the computer could be adapted to generate an analog voltage indicative of fuel flow which would be applied to a variable duty cycle square wave oscillator having its output connected to the solenoid driver circuit (e.g., a darlington transistor). The computer 22 could, of course, take the form of an analog computer or a digital computer (e.g., a microprocessor based microcomputer) and may even be arranged to directly pulse the solenoid of the flow diverter valve 16.

Figure 2:
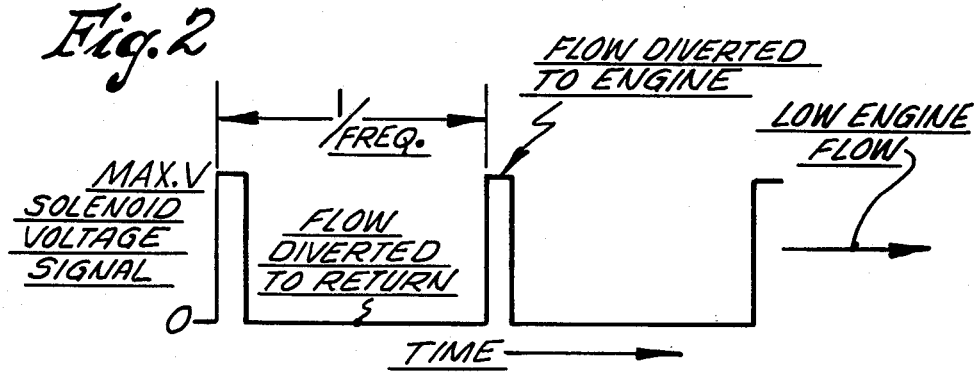
FIG. 2 shows a typical voltage wave form applied to the solenoid for low engine flow.
Figure 3:
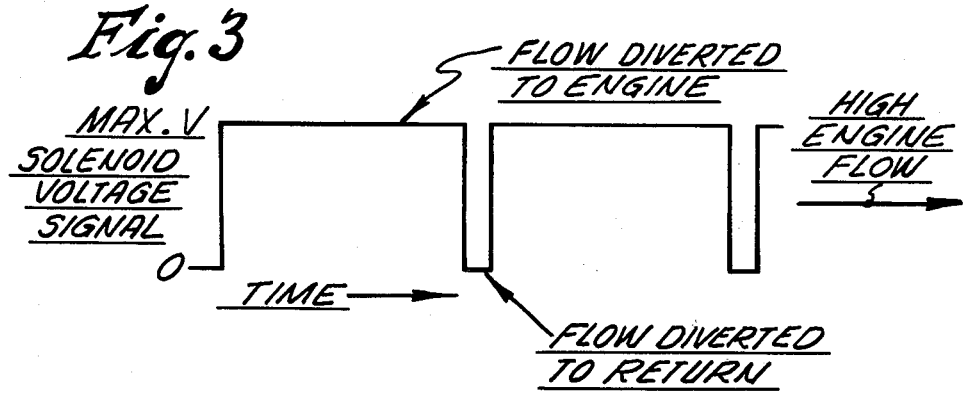
FIG. 3 shows a typical voltage wave form applied to the solenoid for high engine flow.

Typical voltage waveforms, which are applied to a solenoid in a fuel control of the invention, are depicted in FIGS. 2 and 3. The frequency of voltage pulses applied to the solenoid may be of the order of between 50 and 100 Hz. The fuel flow directed to the engine burner nozzles is a linear function of the duty cycle (i.e., the ratio of the time that current is supplied to the solenoid to the period). Although the depicted pulse width modulation is the preferable method, pulse ratio modulation wherein both pulses width and frequency are variables is also a suitable method of pulsing the solenoid. In FIG. 2, wherein the duty cycle is about 10%, 10% of the constant flow is delivered to the engine. In like manner, in FIG. 3, wherein the duty cycle is about 90%, 90% of the constant flow is delivered to the engine. It will be appreciated, of course, that the portion of the constant flow which is not delivered to the engine is directed back or bypassed to the inlet side of the pump 10.

Turning now to FIG. 4, wherein an embodiment of the invention adapted for use with a positive displacement pump is illustrated, therein is shown a plural cavity housing 24 in which the constant flow regulator 14 and flow diverter 16 are disposed. The housing has an inlet conduit 26 which receives flow from the pump and defines the discharge conduit 18 through which flow is delivered to the engine. Housing 24 also includes bupass conduit 20 which receives not only that flow bypassed by the flow diverter 16 but also the flow bypassed by the constant flow regulator 14. The bypass conduit 20 is connected to the pump inlet by means not illustrated in FIG. 4.

The main components of the constant flow regulator 14 are a metering jet 28, mounted in the inlet conduit 26, and a bypass differential pressure regulator, generally indicated at 30. The bypass regulator 30 merely functions to maintain a constant pressure differential or head (Pf-Pm) across the metering jet 28 whereby a constant flow always proceeds through the inlet conduit. In essence, the metering jet 28, which produces a pressure drop is constituted by a fixed area sharp-edged orifice.

The bypass regulator 30 includes a diaphragm 32 secured to wall of a cavity 34 in the housing so as to divide the cavity 34 into an upper chamber 36 and a lower chamber 38. A diaphragm washer 40 is attached to the diaphragm 32 and functions as a seat for compression spring 42 and a mounting structure for valve element 44. The upper end of the spring 42 is confined by a spring seat 46 which is engaged by a screw 48 which permits adjustment of the spring preload and hence, the differential pressure across the metering jet 28. The valve element 44 is universally mounted at its upper end by means of a shaft 50 having a spherical intermediate portion disposed within a transverse passage in the valve element 44. The main body of the valve element 44 is of rectangular cross section, as shown in FIG. 5, with rounded edges which slide along a sleeve 52 during upward and downward movement. The lower end of the sleeve 52 defines an orifice 52a into which the conical lower end of the valve element projects so as to vary the flow area thereof during valve element movement.

Pressure sensing conduits 54 and 56 communicate the respective pressures Pf and Pm, existing upstream and downstream of the metering jet 28, to the lower chamber 38 and the upper chamber 36. A damping orifice 58 is inserted in conduit 56 to attenuate pressure fluctuations in the upper chamber 36 in accordance with the usual practice in such regulators.

During operation of the bypass regulator 30, flow will proceed through conduit 54, chamber 38, the passages defined between the main body of valve element 34 and the sleeve 52 and finally through orifice 52a before entering the bypass conduit 20. Because of the fact that the downstream flow is never deadheaded, the pressure Pm will not fluctuate significantly and adversely affect the operation of the regulator 30. Because of the universal mounting of the valve element 44, any side loading imposed upon the diaphragm 32, will not result in binding of the valve element against the sleeve 52.

The constant fuel flow from the constant flow regulator 14 proceeds along the inlet conduit 26 to the solenoid controlled flow diverter 16. The heart of the flow diverter 16 is a flow dividing device comprising a ball element 60 which is rapidly displaced between a first seat 61 and a second seat 62 formed in the housing. The shifting ball element 60 causes flows in the discharge conduit 18 and the bypass conduit 20 to be essentially mutually exclusive. As can be seen in FIG. 4, the orifices or outlet ports defined by first and second valve seats 61 and 62 of the flow diverter 16 respectively communicate with the fuel discharge conduit 18 and the bypass conduit 20. As will be appreciated by those skilled in the art, the ball element 60 is constrained against lateral movement.

Solenoid 64 has a threaded upper section 66 which is screwed into the housing 24 for fixedly mounting the solenoid in proximate relationship to the ball element 60. The solenoid 64 has a plunger 68, the tip of which lies just below the ball when the solenoid is energized as is depicted in FIG. 4. Above the ball element 60, a spring loaded spool 70, aligned with plunger 68 has its tip in constant engagement with the upper surface of the ball element 60 to provide a downward bias thereupon. The solenoid 64 is provided with an adjustment set screw 72 to allow for setting the internal spring preload exerted on the plunger 68. When the solenoid 64 is deenergized, the preload overrides the spring loaded spool 70, thereby causing the ball element 60 to be urged against the upper seat 61.

The electronic computer 22, which senses various engine parameters such as set and sensed speed and compressor discharge pressure, generates an analog control signal representative of a scheduled fuel flow to a variable duty cycle square wave oscillator 74. The variable duty cycle oscillator is a fixed frequency (e.g., 50 Hz.) device which generates a square wave voltage form having a certain voltage V for a portion of each cycle and zero voltage for the remaining portion of each cycle. The respective fractions of a cycle during which the output of the oscillator is V and zero are proportional to the magnitude of the signal from the electronic computer 22. The square wave voltage form from the oscillator is applied to a solenoid driver 76 (e.g., a Darlington transistor) which is connected to solenoid 64 for directing current therethrough. The frequency of the oscillator is selected so as to be compatible with engine operation.

In operation, the control will not commence functioning until the pump 10 attains a speed sufficient to deliver the constant flow required. The pump may be driven by the engine or a motor. The metering jet 28 and the bypass regulator 30 are preferably sized such that the constant flow is slightly greater (e.g., 10%) than the maximum fuel flow required by the engine. The solenoid 64 is cycled by the oscillator 74 in accordance with the control signal generated by the computer 22. The constant fuel flow in the inlet conduit 26 is apportioned by the pulsating ball elememt 60 between the fuel discharge conduit 18 and the bypass conduit 20 by alternatively choking the first and second outlet ports in such a manner that the scheduled fuel flow is delivered to the engine.

Obviously many modifications and variations are possible in light of the above teachings without departing from the scope and spirit of the invention as defined in the subjoined claims.

We claim:

1. In a fuel control for a gas turbine engine of the type having: a pump for delivering a pressurized flow of fuel; an inlet conduit for receiving fuel flow from the pump; a discharge conduit in fluid communication with the inlet conduit for delivering fuel to the engine; and a computer responsive to selected engine parameters for generating a signal indicative of a requested fuel flow, the improvement comprising:

a constant flow regulator fluidly connected to the pump and the inlet conduit for generating a constant flow of fuel in the inlet conduit;

a bypass conduit in fluid communication with the inlet side of the pump for returning fuel thereto; and a flow diverter, having first and second outlet ports, positioned in the inlet conduit such that it receives the constant fuel flow therein and has the first and second outlet ports in respective fluid connection with the discharge conduit and the bypass conduit, the flow diverter including a flow dividing device responsive to the signal from the computer for apportioning the constant fuel flow between the first and second outlet ports so that the requested fuel flow is delivered to the discharge conduit and the remainder of the constant fuel flow is delivered to the bypass conduit.

2. The improvement of claim 1, wherein the flow dividing device comprises:

a ball element disposed in the inlet conduit and displaceable between a first position in which it chokes the first outlet port and a second position in which it chokes the second outlet port such that the constant fuel flow is directed through the outlet port which is not choked;

a solenoid, having a plunger, mounted in the fuel control such that movement of the plunger displaces the ball element, the solenoid being operatively connected to the computer so that voltage pulses having a duty cycle commensurate with the requested fuel flow signal may be applied thereto.

3. The improvement of claim 2 wherein the computer is of the type which generates a signal in the form of an analog voltage and wherein the operative connection between the computer and the solenoid comprises:

a fixed frequency variable duty cycle oscillator adapted to generate a voltage wave form having a duty cycle commensurate with the signal from the computer; and a solenoid driver connected to the solenoid and to the oscillator for receiving the voltage waveform generated thereby.

4. The improvement of claim 1, wherein the pump is of the positive displacement type and the constant flow regulator comprises:

a metering jet positioned in the inlet conduit for producing a pressure drop in the flow through the inlet conduit; and a bypass differential pressure regulator in fluid connection with the inlet conduit at locations upstream and downstream of the metering jet and in fluid connection with the bypass conduit, the bypass regulator being adapted to bypass some of the flow in the inlet conduit upstream of the metering jet to the bypass conduit so as to hold a constant differential pressure across the metering jet whereby a constant fuel flow will proceed through the inlet conduit downstream of the metering jet.

5. In a method of controlling fuel flow to a gas turbine engine which is of the type which comprises pumping a flow of fuel, and computing a scheduled fuel flow in accordance with selected engine parameters, the improvement comprising:

regulating the flow of fuel so as to generate a constant fuel flow; and apportioning the constant fuel flow between a discharge conduit which carries fuel to the engine and a bypass conduit, running between a flow diverter and a pump intake, which carries fuel back to the pump such that the scheduled fuel flow is delivered to the engine.

6. The improved method of claim 5, wherein the regulating comprises:

producing a pressure drop in the pumped flow of fuel; and bypassing a portion of the pumped flow of fuel so as to maintain the pressure drop at a constant value.

7. The improved method of claim 6, wherein the apportioning comprises:

switching the constant flow of fuel between the discharge conduit and the bypass conduit.

8. The improved method of claim 7, wherein the switching of the constant flow of fuel comprises:

pulsing a solenoid.

9. In a fuel control for a gas turbine engine of the type having a positive displacement pump for delivering a pressurized flow of fuel; an inlet conduit for receiving fuel flow from the pump; a discharge conduit in fluid communication with the inlet conduit for delivering fuel to the engine; and an electronic computer responsive to selected engine parameters for generating an analog voltage signal indicative of a requested fuel flow, the improvement comprising:

a metering jet positioned in the inlet conduit for producing a pressure drop in the flow through the inlet conduit;

a bypass differential pressure regulator in fluid connection with the inlet conduit at locations upstream and downstream of the metering jet, the bypass regulator being adapted to bypass some of the flow in the inlet conduit upstream of the metering jet so as to hold a constant differential pressure across the metering jet whereby a constant fuel flow will proceed through the inlet conduit downstream of the metering jet;

first and second seats located in the inlet conduit downstream of the metering jet and defining first and second outlet ports, the first outlet port being in fluid connection with the discharge conduit;

a bypass conduit in fluid connection with the second outlet port and the bypass regulator for bypassing fuel received through the second outlet port and also fuel bypassed by the bypass regulator to the inlet side of the pump;

a ball element disposed in the inlet conduit and displaceable between a first position in which it is seated against the first seat so as to choke the first outlet port and a second position in which it is seated against the second seat so as to choke the second outlet port; and a solenoid, having a plunger, mounted in the fuel control such that movement of the plunger displaces the ball element, the solenoid being operatively connected to the computer in such a manner that voltage pulses having a duty cycle commensurate with the voltage signal may be applied thereto.

* * * * *